Patented Aug. 9, 1949

2,478,367

UNITED STATES PATENT OFFICE 2,478,367

N,N'-ALKYLENECYANINE DYES

Leslie G. S. Brooker and Robert H. Sprague, Rochester, N. Y., assignors to Eastman Kodak Company, Rochester, N. Y., a corporation of New Jersey No Drawing. Application November 11, 1944, Serial No. 563,086

11 Claims. (Cl. 260—240)

This invention relates to N,N'-alkylenecyanine dyes and to a process for the preparation thereof.

It is known that N,N'-methylene- and N,N'-ethylene cyanine dyes can be prepared by condensing di-2-quinolylmethane with methylene iodide or ethylene bromide, and treating the resulting condensation product with pyridine or alkali [Scheibe and Fischer, Ber. 59, 502 (1926)].

We have now found that these known 2,2'-cyanine dyes, as well as heretofore unknown N,N'-alkylenecyanine dyes which are not obtainable by the method of Scheibe and Fischer, can be prepared by condensing a di-2-quinolylmethane, a di-2-benzothiazolylmethane, a di-2-benzoxazolylmethane or other bis heterocyclic base derivatives of methane with an alkylene arylsulfonate. Our new process gives higher yields than the process of Scheibe and Fischer (in some cases very much higher), in addition to providing a means for obtaining N,N'-alkylenecyanine dyes which could not be obtained by the prior process.

It is, accordingly, an object of our invention to provide new N,N'-alkylenecyanine dyes. A further object is to provide a process for the preparation of such dyes. Other objects will appear hereinafter.

The N,N'-alkylenecyanine dyes can be prepared, in accordance with our invention, by reacting with an alkylene salt of the following general formula:

$$X-(CH_2)_n-X'$$

wherein $n$ represents a positive integer of from 2 to 3, and X and X' each represents an aryl sulfonate radical, upon a heterocyclic base derivative of methane of the following general formula:

wherein Z and Z' each represents the non-metallic atoms necessary to complete a heterocyclic nucleus containing from 5 to 6 atoms in the heterocyclic ring, followed by reacting upon the resulting hydro salt with an acid-binding agent. The process can be illustrated schematically for the preparation of 3,3'-ethylenethiacyanine p-toluenesulfonate as follows:

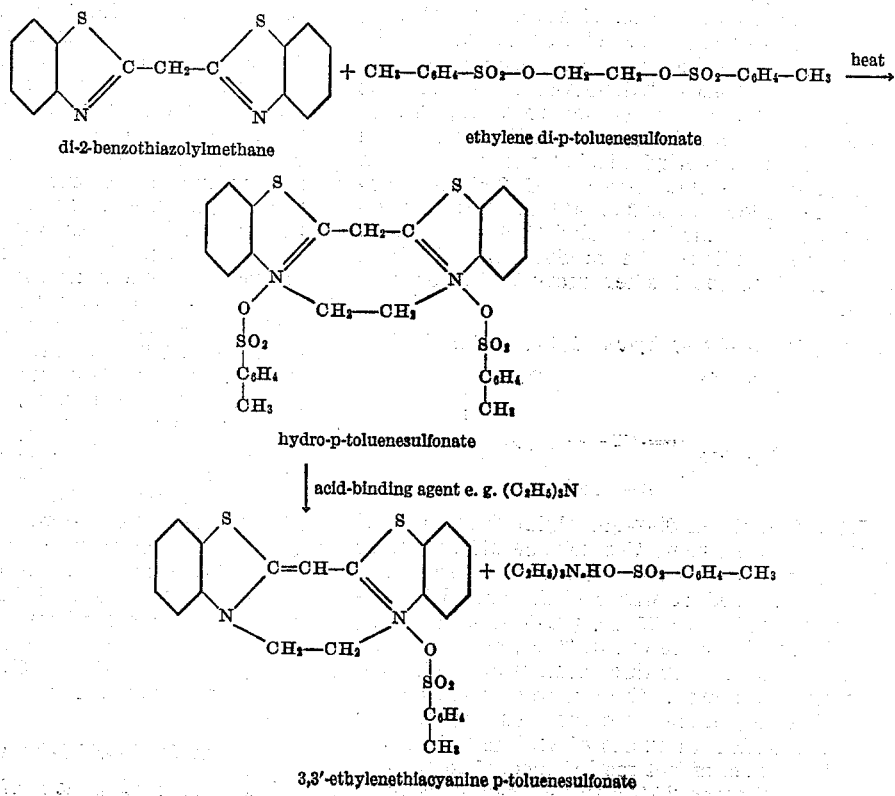

The cyanine arylsulfonates are advantageously converted to the more insoluble cyanine iodides to facilitate isolation from the reaction mixture, by treatment with sodium or potassium iodide. The cyanine bromides and perchlorates can be similarly obtained.

The heterocyclic base derivative of methane is advantageously heated with the alkylene aryl sulfonate at from 150 to 200° C., although higher or lower temperatures can be used. The acid-binding agent employed to convert the hydrosalt to the N,N'-alkylene cyanine salt is advantageously a strong organic base, such as a trialkylamine, a dialkylamine, a N-alkylpiperidine, etc., although sodium carbonate, ammonia, or other acid-binding agents can be used. As alkylene arylsulfonates, alkylene p-toluene-sulfonates are advantageously employed, although alkylene benzenesulfonates and other alkylene arylsulfonates can be employed.

The following examples will serve to illustrate our new dyes and the manner of obtaining them.

*Example 1.—3,3'-ethylenethiacyanine iodide*

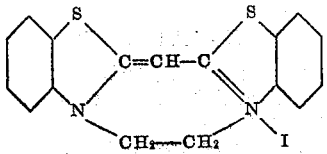

8.4 g. (1 mol.) of di-2-benzothiazolylmethane and 11.1 g. (1 mol.) of ethylene di-p-toluenesulfonate were heated together for 5 hours, at 170° C. The resulting solid yellow product was cooled and crushed under 25 cc. of acetone. The crushed yellow product was filtered off with suction and washed on the filter with acetone. The hydro-p-toluenesulfonate thus obtained was suspended in 50 cc. of hot methyl alcohol and an excess of triethylamine was added to the suspension. The yellow solid dissolved at once, giving a clear yellow solution. An excess of sodium iodide, dissolved in 20 cc. of hot methyl alcohol, was added to the yellow solution to convert the 3,3'-ethylenecyanine p-toluenesulfonate to the more insoluble 3,3'-ethylenecyanine iodide. The resulting mixture was chilled to 0° C., filtered with suction, and the cyanine iodide washed on the filter with methyl alcohol and with water. The yield of yellow crystals of 3,3'-ethylenethiacyanine iodide was 6 g. (46%). After recrystallization from methyl alcohol (140 cc. per gram of cyanine iodide), the product melted above 330° C. The yield after recrystallization was 38%.

*Example 2.—1,1'-ethylene-2,2'-cyanine iodide*

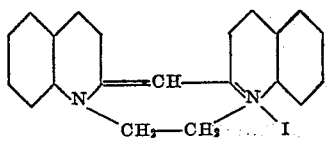

5.4 g. (1 mol.) of di-2-quinolylmethane and 7.4 g. (1 mol.) of ethylene di-p-toluenesulfonate were heated together at 160° C. for 16 hours. The viscous red product was cooled, washed by decantation with two 25 cc. portions of acetone, and the residue dissolved in 30 cc. of hot methyl alcohol. To the resulting solution of the hydro-p-toluenesulfonate of the dye was added an excess of triethylamine. To the resulting mixture was then added an excess of sodium iodide dissolved in 20 cc. of hot methyl alcohol to convert the 1,1'-ethylene-2,2'-cyanine p-toluenesulfonate to the more insoluble 1,1'-ethylene-2,2'-cyanine iodide. The resulting mixture was chilled to 0° C., and the cyanine iodide filtered off with suction. It was washed on the filter with acetone and water and dried in the air. The yield of minute green crystals was 1.4 g. (16%). After recrystallization from methyl alcohol (50 cc. per gram of crystals), the cyanine iodide was obtained as red needles, having a green reflex and melting above 330° C. The recrystallized yield was 5 per cent.

*Example 3.—3,3'-ethyleneoxacyanine iodide*

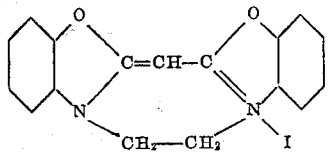

2.6 g. (1 mol.) of di-2-benzoxazolylmethane and 3.7 g. (1 mol.) of ethylene di-p-toluenesulfonate were heated together at 230° C. for 10 minutes. The resulting viscous greenish product was cooled, washed by decantation with 15 cc. of acetone and dissolved in 20 cc. of hot methyl alcohol. To the resulting solution containing the hydro-p-toluenesulfonate were added 2 cc. of triethylamine. The 3,3'-ethyleneoxacyanine p-toluenesulfonate was converted to the more insoluble 3,3'-ethyleneoxacyanine iodide by adding to the mixture an excess of sodium iodide dissolved in hot methyl alcohol. The mixture was then chilled to 0° C., the cyanine iodide filtered off with suction, washed on the filter with water and then with acetone. After recrystallization from methyl alcohol, the product consisted of a mixture of pale yellow needles and colorless crystals. The colorless material was removed by extraction with three 25 cc. portions of acetone. The remaining yellow crystals were then recrystallized from methyl alcohol (100 cc. per gram of crystals). The recrystallized yield was 0.3 g. (8%). The cyanine iodide melted above 325° C.

In a manner similar to that illustrated in the foregoing examples other N,N'-alkylenecyanine dyes can be prepared from heterocyclic base derivatives of methane, e. g. di-2-benzoselenazolylmethane, di-2-(4-methyl-thiazolyl)-methane, di-2-(4-phenylthiazolyl)-methane, di-2-(5-methylbenzoxazole)-methane, 2-benzothiazolyl-2-quinolylmethane or 2-benzoxazolyl-2-benzothiazolylmethane. Di-2-quinolylmethane is described by Scheibe and Fischer, supra. Di-2-benzothiazolylmethane can be prepared by condensing o-amino-phenyl mercaptan with ethylmalonate according to the method of Mills, J. Chem. Soc. 121, 455 (1922). Di-2-benzoxazolylmethane and di-2-benzoselenazolylmethane can also be prepared according to the method of Mills, using o-amino-phenol or o-aminoselenophenol instead of o-aminophenyl mercaptan. Di-2-(4-methylthiazolyl)-methane and di-2-phenylthiazolyl)-methane can be prepared as described by H. Lehr et al., Helv. chim. Acta 27, 970 (1944). Di-2-(5-methylbenzoxazole)-methane and 2-benzoxazolyl-2-benzothiazolyl-methane are described in United States Patent 2,323,503, dated July 6, 1943, and any of the heterocyclic base derivatives set forth in that patent can be employed in practicing our invention. The following example shows the preparation of di-2-benzoxazolylmethane.

*Example 4.—Di-2-benzoxazolylmethane*

96.3 grams (2 mols.) of o-aminophenol and 71.0 grams (1 mol.) of ethyl malonate were boiled gently under reflux for 30 minutes. A stream of $CO_2$ gas was passed through the apparatus during the reaction and steam was passed through the condenser to facilitate the escape of the ethyl alcohol formed in the condensation. The reaction mixture was cooled and extracted with 1200 cc. hot ligroin and dried. The yield of pinkish crystals melting at 96 to 98° C. was 33.3 grams, 30 per cent.

2-benzothiazolyl - 2 - quinolylmethane can be prepared by condensing 2-chlorobenzothiazole with quinaldine. The following example illustrates the preparation:

*Example 4a.—2-benzothiazolyl-2-quinolyl-methane*

85 g. (1 mol.) of 2-chlorobenzothiazole and 143 g. (2 mols.) of quinaldine were boiled together under reflux for 20 minutes. The resulting orange mixture was cooled, made alkaline with 40 per cent sodium hydroxide solution and excess quinaldine removed by steam distillation. The residue from the distillation was washed by decantation with water, and the sticky residue was extracted with 1600 cc. of hot ligroin. (An insoluble residue contains a tri-nuclear base, di-2-benzothiazolyl - 2 - quinolylmethane.) The ligroin solution was chilled to 0° C., the orange crystals filtered off with suction, washed on the filter with ligroin and dried. The yield was 33.0 g., 24 per cent. After recrystallization from ligroin, the product was obtained as orange crystals melting at 82° to 83° C. The yield of purified material was 19 per cent.

N,N'-alkylenecyanine dyes in which the alkylene group contains from 2 to 3 carbon atoms can also be prepared, we have found, by heating a N-bromoalkylcyanine base of the following general formula:

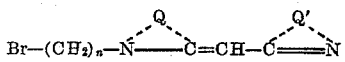

wherein $n$ represents a positive integer of from 2 to 3, and Q and Q' each represents the non-metallic atoms necessary to complete a heterocyclic nucleus containing from 5 to 6 atoms in the heterocyclic ring. The process can be illustrated for 3,3'-ethylenethiacyanine bromide as follows:

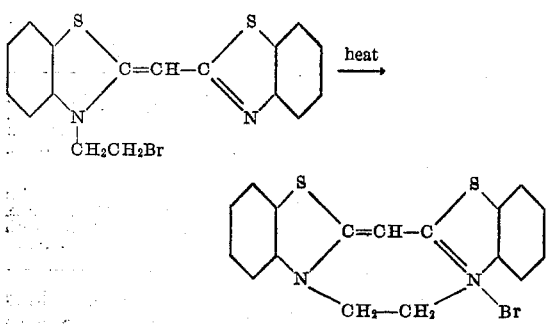

The heating is advantageously carried out at from 150° to 200° C. The resulting N,N'-alkylenecyanine bromide can be converted into the more insoluble iodide by treatment of an alcoholic solution thereof with an alcoholic solution of an alkali metal iodide. Using an alkali metal perchlorate, the N,N'-alkylene cyanine perchlorates can be obtained. The N,N'-alkylene cyanine bromides and iodides can be converted into the chlorides by treatment with silver chloride in a phenol according to the process described in United States Patent 2,245,249, dated June 10, 1941.

The starting N-bromoalkylcyanine base can be prepared by condensing a N-hydroxyalkylcyanine base with phosphorous tribromide. The N-hydroxyalkylcyanine bases can be obtained by condensing a cyclammonium β-hydroxyethyl-, or γ-hydroxypropyl quaternary salt containing a reactive methyl group in the α-position with a heterocyclic nitrogen base containing, in the α-position, a thioether group, e. g. an alkylthio group or an arylthio group, in the presence of an acid-binding agent, e. g. a tertiary organic amine, such as pyridine, a trialkylamine or N-methylpiperidine, or an alkali metal carbonate, such as potassium or sodium carbonate. The starting cyanine base can also be prepared by reacting with ethylene bromohydrin or propylene-1,3-bromohydrin upon a base of the following formula:

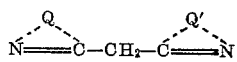

wherein Q and Q' each represents the nonmetallic atoms necessary to complete a heterocyclic nucleus containing from 5 to 6 atoms in the heterocyclic ring, and then reacting upon the resulting hydrobromide with an acid-binding agent to split out the elements of hydrogen bromide. The acid-binding agent employed in this case is advantageously ammonia, although other organic bases, such as those given immediately above can also be employed, as can alkali metal carbonates. The following examples will serve to illustrate the manner of obtaining N,N'-alkylene cyanine dyes from N-bromoalkylcyanine bases.

*Example 5.—3,3'-ethylenethiacyanine iodide*

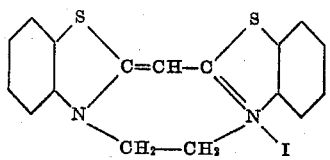

2 g. (1 mol.) of 2-(3-β-bromoethyl-2(3)-benzothiazolylidene) methylbenzothiazole were heated at 170° C. for 4 hours. The resulting yellow product (3,3'-ethylenethiacyanine bromide) was cooled and dissolved in 20 cc. of hot methyl alcohol. To the hot methyl alcohol solution was added a solution of sodium iodide in methyl alcohol to precipitate the 3,3'-ethylenethiacyanine as the iodide. The resulting mixture was chilled to 0° C., and the cyanine iodide filtered off with suction and washed on the filter with 10 cc. of acetone, followed by 10 cc. of water. The cyanine iodide was then dried in the air. 1.9 g. (85% yield) of the cyanine iodide was obtained as yellow crystals. After recrystallization from methyl alcohol (140 cc. per gram of cyanine iodide), the cyanine iodide melted above 330° C. The yield of recrystallized product was 1.4 g. (63%). The cyanine iodide gave a yellow solution in methyl alcohol, having a strong blue fluoresence.

The 2-(3-β-bromoethyl-2(3)-benzothiazolylidene) methylbenzothiazole

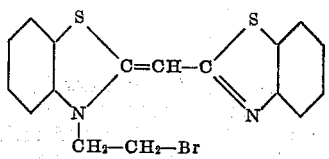

employed above, was prepared as follows:

3.9 g. (1 mol.) of 2-(3-β-hydroxyethyl-2(3)-benzothiazolylidene) methylbenzothiazole and 10 cc. of phosphorous tribromide were heated together on a steam bath for one hour. A yellow solution formed which set to a solid mass of yellow crystals after 10 minutes heating. The reaction mass was cooled, broken up, and poured onto ice and made alkaline with 30 per cent ammonium hydroxide. The yellow crystals of the β-bromoethyl compound were then filtered off, washed on the filter with water, and dried in the air. The yield was 3.7 g. (79%), and the crystals melted initially at 85° to 90° C. As the temperature of the melting point bath was raised higher, the product resolidified and did not remelt at 320° C. The product appeared to rearrange upon attempted recrystallization from acetone giving a substance which melted above 320° C. Accordingly, the original air-dried product was used without further treatment.

The 2-(3-β-hydroxyethyl-2(3)-benzothiazolylidene) methylbenzothiazole

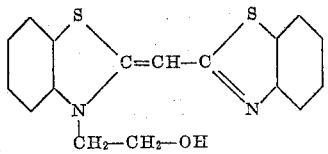

employed above was prepared as follows:

14.1 g. (1 mol.) of di-2-benzothiazolylmethane (prepared by the method of Mills, J. Chem. Soc. 121, 455, 1922) and 6.25 g. (1 mol.) of ethylene bromohydrin were heated together at 115° C. for 16 hours. The resulting yellow solid mass was crushed under 50 cc. of cold acetone, filtered with suction, washed on the filter with 25 cc. of acetone and dried in the air. The yield of yellow crystals was 19.8 g. (97%) which melted at 256° to 258° C. with decomposition. The hydrobromide

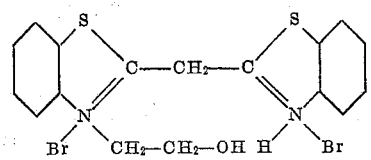

thus obtained was suspended in 50 cc. of methyl alcohol and the resulting suspension was made alkaline with 25 cc. of 30 per cent ammonium hydroxide. The solid hydrobromide dissolved at once, giving a yellow solution from which the free base separated as yellow crystals upon stirring. The mixture was chilled at 0° C., filtered with suction, washed on the filter with 25 cc. of methyl alcohol and dried in the air. After recrystallization from methyl alcohol (100 cc. per gram of base), the base was obtained as yellow needles, melting with decomposition at 185° to 187° C. The yield was 11.9 g. (73%).

*Example 6.—1',3-ethylenethia-2'-cyanine iodide*

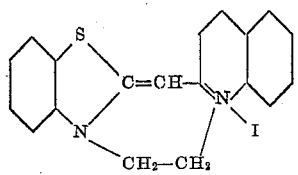

7.6 g. (1 mol.) of 2-(3-β-bromoethyl-2(3)-benzothiazolylidene) methylquinoline were heated at 170° C. for three hours. The red solid product was recrystallized several times from MeOH (200 cc. per gram). The yield of purified dye was 2.4 g., 28%. The dye melted at 320–25° with decomposition.

The 2-(3-β-bromoethyl-2(3)-benzothiazolylidene)-methylquinoline employed above was prepared as follows:

10.7 g. (1 mol.) of 2-(3-β-hydroxyethyl-2(3)-benzothiazolylidene) methylquinoline and 10 cc. of PBr₃ were boiled together under reflux for five minutes. The product was cooled, stirred with ice and water, filtered with suction and washed on the filter with water and acetone. The red crystals were then suspended in 50 cc. MeOH and the mixture made alkaline with Na₂CO₃. The sticky brown product was filtered off, washed with MeOH and recrystallized from MeOH (450 cc. per gram). The yield of purified product was 8.5 g., 67%. The product was obtained as orange needles melting at 147–8° C.

The 2-(3-β-hydroxyethyl-2(3)-benzothiazolylidene)-methylquinoline employed above was prepared as follows:

31.2 g. (1 mol) of 2-methylbenzothiazole-β-hydroxyethobromide and 25.0 g. (1 mol+25% excess) of 2-methylmercaptoquinoline were boiled under reflux for fifteen minutes. The red solid product was cooled, washed by decantation with 200 cc. cold acetone and recrystallized from 3000 cc. MeOH. The yield of red crystals melting at 277–8° C. was 15.4 g., 34%. The hydrobromide thus obtained was then suspended in 100 cc. abs. EtOH and 5 cc. triethylamine added. The mixture was chilled, diluted with 1000 cc. of water and the free base filtered off. The yield of orange crystals which melted at 143–4° C. was 11.0 g., 30%.

In a manner similar to that illustrated in the foregoing Examples 5 and 6, 1',3-ethyleneselena-2'-cyanine iodide, 3,3'-ethyleneselenathiacyanine iodide, 3,3-propylenethiacyanine iodide and 3,3'-ethyleneselenacyanine iodide can be prepared.

Those N,N'-alkylenecyanine dyes obtainable by our process and containing a simple thiazole nucleus (e. g. 4-methylthiazole or 4-phenylthiazole), a benzothiazole nucleus, a benzoxazole nucleus or a benzoselenazole nucleus are new.

The N,N'-alkylenecyanine dyes obtainable by our process sensitize photographic silver halide emulsions when incorporated therein. The following table shows the sensitizing action of the N,N'-alkylenecyanine dyes of Examples 1 to 6.

| Dye | Concentration | Emulsion | Sensitizing Action |
|---|---|---|---|
| Ex. 1 | 20 mg. 1 liter of emulsion. | gelatino - silver chlorobromide. | extends to 490 mu with max. at 465 mu, weak. |
| Ex. 2 | do | gelatino - silver-bromiodide. | extends to 570 mu with max. at 565 mu, strong. |
| Ex. 3 | do | gelatino- silver chlorobromide. | trace. |
| Ex. 5 | do | do | extends to 490 mu with max. at 465 mu, weak. |
| Ex. 6 | do | do | extends to 560 mu with max. at 520 mu, strong. |

In the preparation of photographic emulsions containing our new dyes, it is only necessary to disperse the dyes in the emulsions. The methods of incorporating dyes in emulsions are simple and well known to those skilled in the art. It is convenient to add the dyes from solutions in appropriate solvents. Methanol has proven satisfactory as a solvent for our new dyes. Ethyl alcohol or acetone may also be employed where the solubility of the dyes in methanol is lower than desired.

Sensitization by means of our new dyes is, of course, directed primarily to the ordinarily employed gelatino-silver-halide developing-out emulsions. The dyes are advantageously incorporated in the washed, finished emulsions and should, of course, be uniformly distributed throughout the emulsions.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which includes most of the ordinarily employed gelatino-silver chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

Our new dyes give rise to two extreme resonance configurations as do N,N'-dialkylcyanine dyes. For instance in the case of 1',3-ethylenethia-2'-cyanine iodide (Example 6), the extreme configurations can be represented as follows:

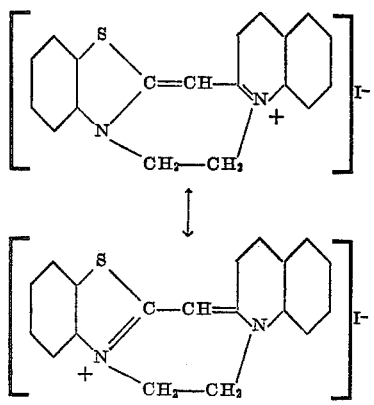

The term "simple thiazole" is employed herein to indicate a thiazole which does not contain a fused-on aryl nucleus. 4-methylthiazole and 4-phenylthiazole are typical simple thiazoles. Benzothiazole, on the other hand, contains a fused-on benzene nucleus.

What we claim and desire to be secured by Letters Patent of the United States is:

1. The symmetrical N,N'-alkylenecyanine dyes of the following formula:

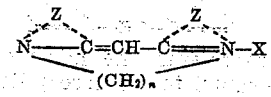

wherein $n$ represents a positive integer of from 2 to 3, X represents an anion and Z represents the non-metallic atoms necessary to complete a heterocyclic nucleus selected from the group consisting of benzoxasole, benzothiazole and benzoselenazole nuclei.

2. The N,N'-alkylenecyanine dyes of the following formula:

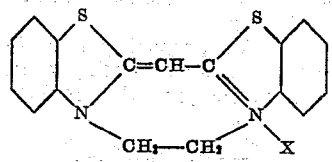

wherein X represents an anion.

3. The N,N'-alkylenecyanine dyes of the following formula:

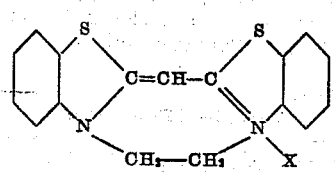

wherein X represents a halide anion.

4. 3,3'-ethylenethiacyanine iodide having the following formula:

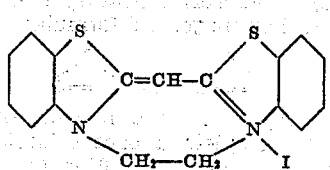

5. The N,N'-alkylenecyanine dyes of the following formula:

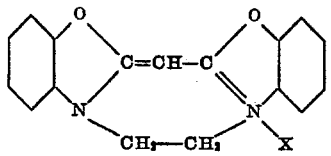

wherein X represents an anion.

6. The N,N'-alkylenecyanine dyes of the following formula:

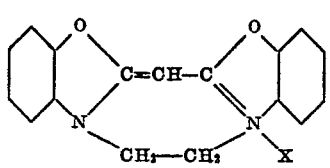

wherein X represents a halide anion.

7. 3,3'-ethyleneoxacyanine iodide having the following formula:

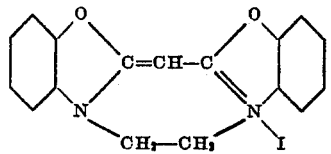

8. A process for preparing a N,N'-alkylenecyanine dye comprising reacting upon a heterocyclic base of the following formula:

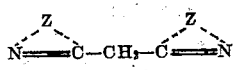

wherein Z represents the non-metallic atoms necessary to complete a heterocyclic nucleus selected from the group consisting of benzoxazole, benzothiazole and benzoselenazole nuclei, with an alkylene arylsulfonate of the following formula:

$$X-(CH_2)_n-X$$

wherein $n$ represents a positive integer of from 2 to 3 and X represents an arylsulfonate radical, and reacting upon the resulting hydro-salt with an acid-binding agent.

9. A process for preparing a N,N'-alkylenecyanine dye comprising heating a heterocyclic base of the following general formula:

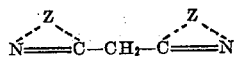

wherein Z represents the non-metallic atoms necessary to complete a heterocyclic nucleus selected from the group consisting of benzoxazole, benzothiazole and benzoselenazole nuclei, with an alkylene p-toluenesulfonate of the following formula:

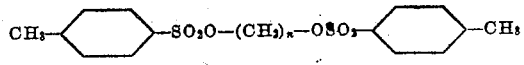

wherein $n$ represents a positive integer of from 2 to 3, and reacting upon the resulting hydro-salt with an acid-binding agent.

10. A process for preparing a N,N'-alkylenecyanine dye comprising heating a heterocyclic base of the following general formula:

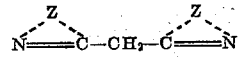

wherein Z represents the non-metallic atoms necessary to complete a benzothiazole nucleus, with an alkylene p-toluenesulfonate of the following formula:

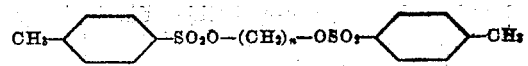

wherein $n$ represents a positive integer of from 2 to 3, and reacting upon the resulting hydro-salt with an acid-binding agent.

11. A process for preparing a N,N'-alkylenecyanine dye comprising heating a heterocyclic base of the following general formula:

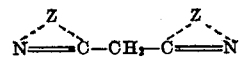

wherein Z represents the non-metallic atoms necessary to complete a benzoxazole nucleus, with an alkylene p-toluenesulfonate of the following formula:

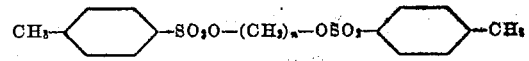

wherein $n$ represents a positive integer of from 2 to 3, and reacting upon the resulting hydro-salt with an acid-binding agent.

LESLIE G. S. BROOKER.
ROBERT H. SPRAGUE.

REFERENCES CITED

The following references are of record in the file of this patent:

UNITED STATES PATENTS

| Number | Name | Date |
|---|---|---|
| 2,166,736 | White | July 18, 1939 |
| 2,265,907 | Kendall | Dec. 9, 1941 |
| 2,282,115 | Brooker | May 5, 1942 |
| 2,298,732 | Brooker | Oct. 13, 1942 |
| 2,320,654 | Riester | June 1, 1943 |
| 2,323,503 | Wilson | July 6, 1943 |
| 2,355,654 | Kendall | Aug. 15, 1944 |
| 2,393,351 | Wilson | Jan. 22, 1946 |

FOREIGN PATENTS

| Number | Country | Date |
|---|---|---|
| 425,609 | Great Britain | 1935 |

OTHER REFERENCES

Berichte, 59, pp. 502–508.